Figure 1:
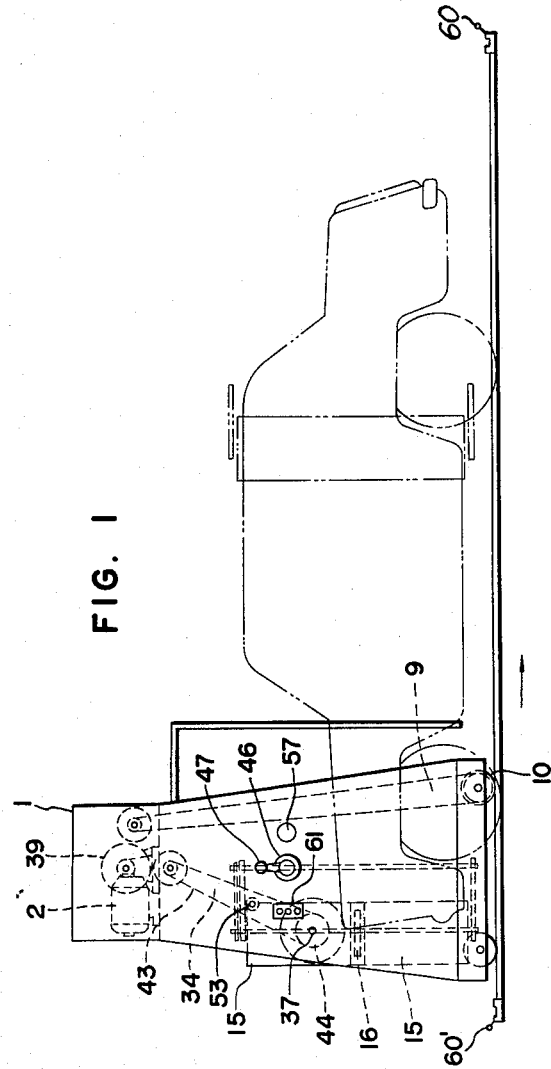

June 8, 1965 SHIGEO TAKEUCHI 3,187,359
DEVICES FOR WASHING THE BODIES OF AUTOMOTIVE VEHICLES
Filed July 26, 1963 7 Sheets-Sheet 3

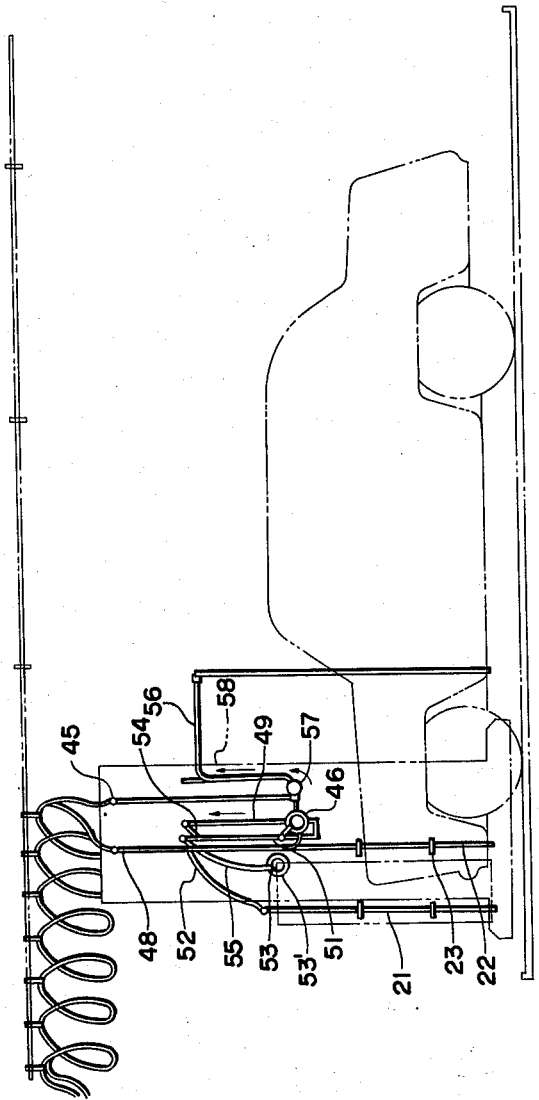

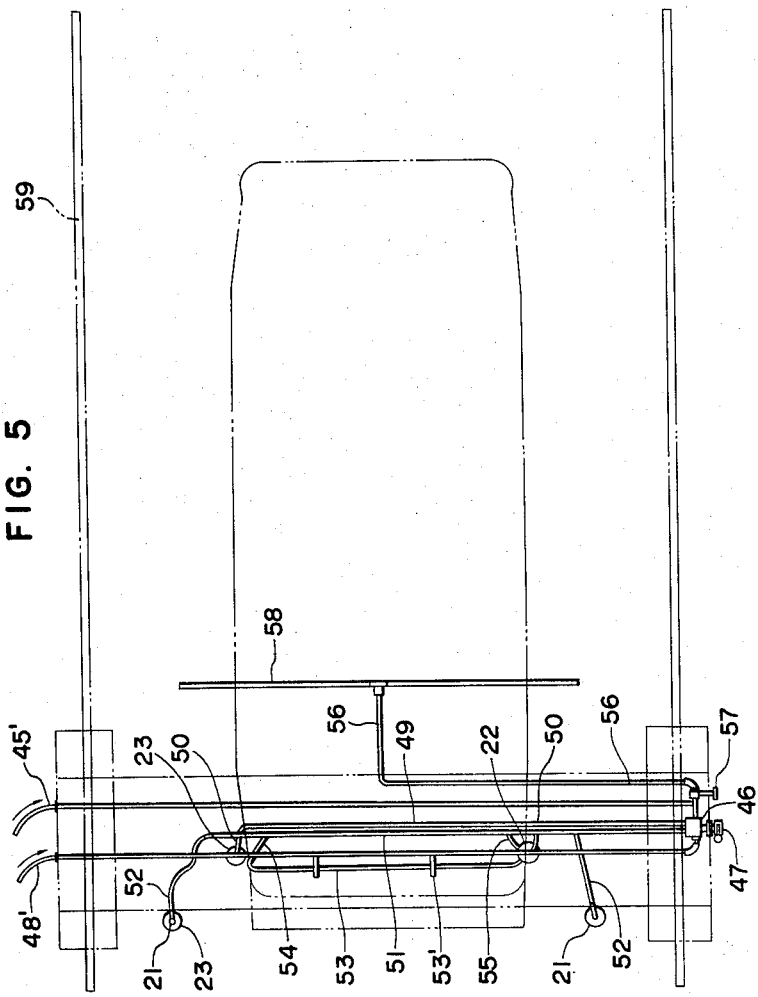

June 8, 1965  SHIGEO TAKEUCHI  3,187,359
DEVICES FOR WASHING THE BODIES OF AUTOMOTIVE VEHICLES
Filed July 26, 1963  7 Sheets-Sheet 6
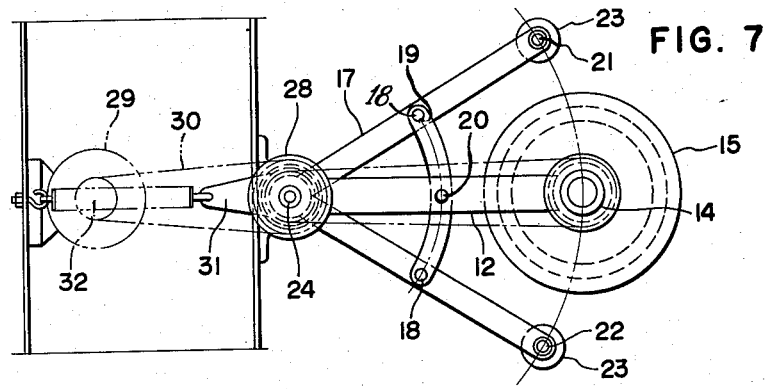
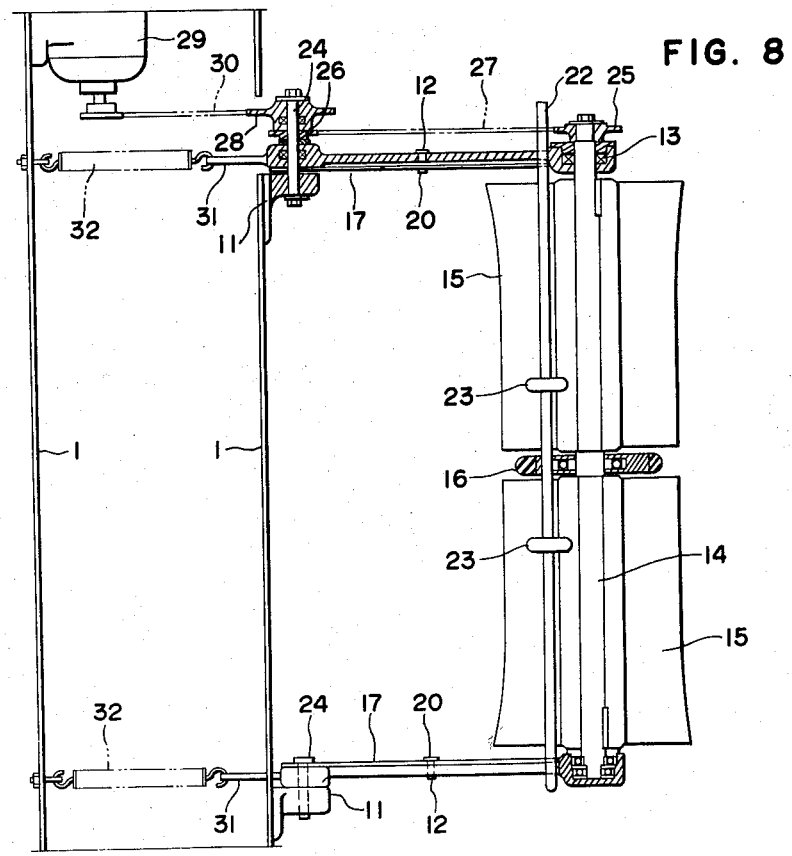

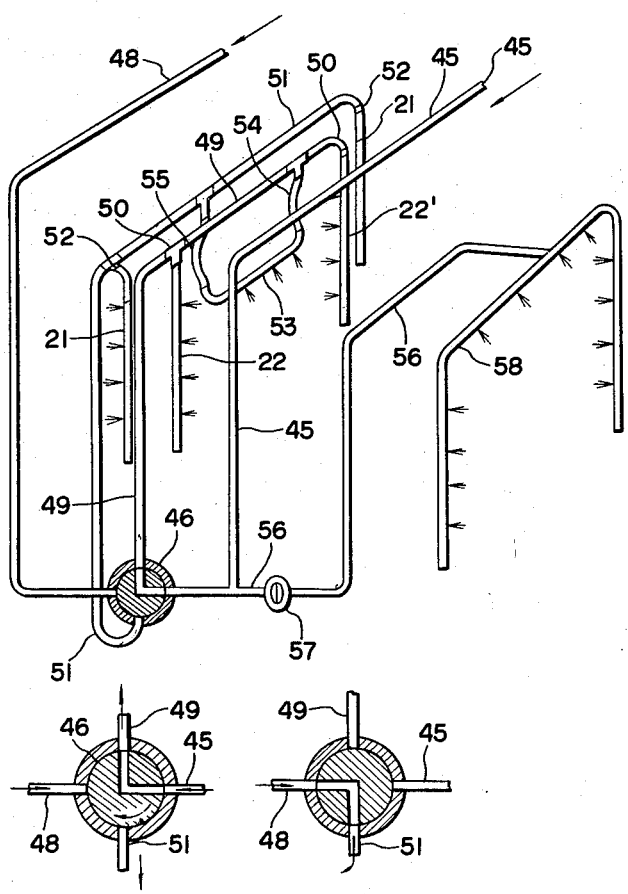

3,187,359
DEVICES FOR WASHING THE BODIES OF AUTOMOTIVE VEHICLES
Shigeo Takeuchi, 2 Kibacho Minato-ku, Nagoya, Japan
Filed July 26, 1963, Ser. No. 297,847
Claims priority, application Japan, July 28, 1962,
37/32,041
4 Claims. (Cl. 15—21)

The present invention relates to devices for washing the bodies of automotive vehicles or the like in an economical and efficient manner with a minimum of labor and space requirement for the purpose.

In conventional methods of washing the bodies of automotive vehicles or the like, washing machines are generally kept stationary and the bodies of the vehicles are made to engage the washing machines and advanced therethrough. Such methods of washing car bodies has been disadvantageous in that not only sufficient washing of the bodies cannot be attained, but also considerable space is required therefor, with additional drawbacks of a lot of labor and washing water requirement involved therein.

The present invention intends to obviate such disadvantages of prior art devices and has for its object to provide a device for washing the bodies of automotive vehicles or the likes which requires a minimum of space, reduces the amount of labor and washing water requirement and yet attains a desired degree of perfect washing.

According to the invention, an automotive vehicle to be washed is held stationary at a predetermined position intermediate between rails of the washing device and a travelling frame is made to move on the rails past the vehicle body. The travelling frame is provided with side and top members on which washing or scrubbing brushes and pipes for supplying fresh water and soapsuds are mounted to wash and clean side surfaces and the upper surfaces of the vehicle body by the rotation of the brushes together with a spray of washing water.

The travelling frame is first moved in one direction so that the body is washed throughout by fresh water, and its motion is reversed by the actuation of a limit switch disposed at the extremity of the rails so that the body, in the return travel of the frame, can be cleaned by soapsuds and subsequently cleaned by fresh water for the purpose of cleaning the body all over.

According to the invention, there is provided a device for washing the body of an automotive vehicle comprising a travelling frame having parallel side members and top longitudinal members disposed in a manner surrounding the vehicle body which is stationary at a predetermined position below said frame and adapted to be reciprocably moved on rails, a pair of brushes rotatably mounted on the inner sides of the frame so that the brushes make rotary abutment with the side surfaces of the vehicle body during travel of the frame, another brush is mounted rotatably depending from the upper part of the frame so that this other brush makes rotary abutment with the upper surfaces of the vehicle body during travel of the frame, pairs of pipes, for supplying a spray of fresh water and soapsuds, vertically disposed on the inner sides of said frame. The pairs of pipes each include one pipe for supplying fresh water and the other for supplying soapsuds so that fresh water and soapsuds can be selectively sprayed. A pipe is provided for selectively supplying fresh water or soapsuds longitudinally horizontally disposed on the upper part of the frame, and a pipe for supplying cleaning fresh water disposed to encircle the vehicle body, whereby washing by fresh water and brushing can be first made during the travel of the travelling frame in one direction, and cleaning by soapsuds and brushing along with subsequent cleaning by fresh water can be made during the return travel of the frame in order to thereby automatically accomplish complete cleaning of the outside faces of the vehicle body.

Figure 2:
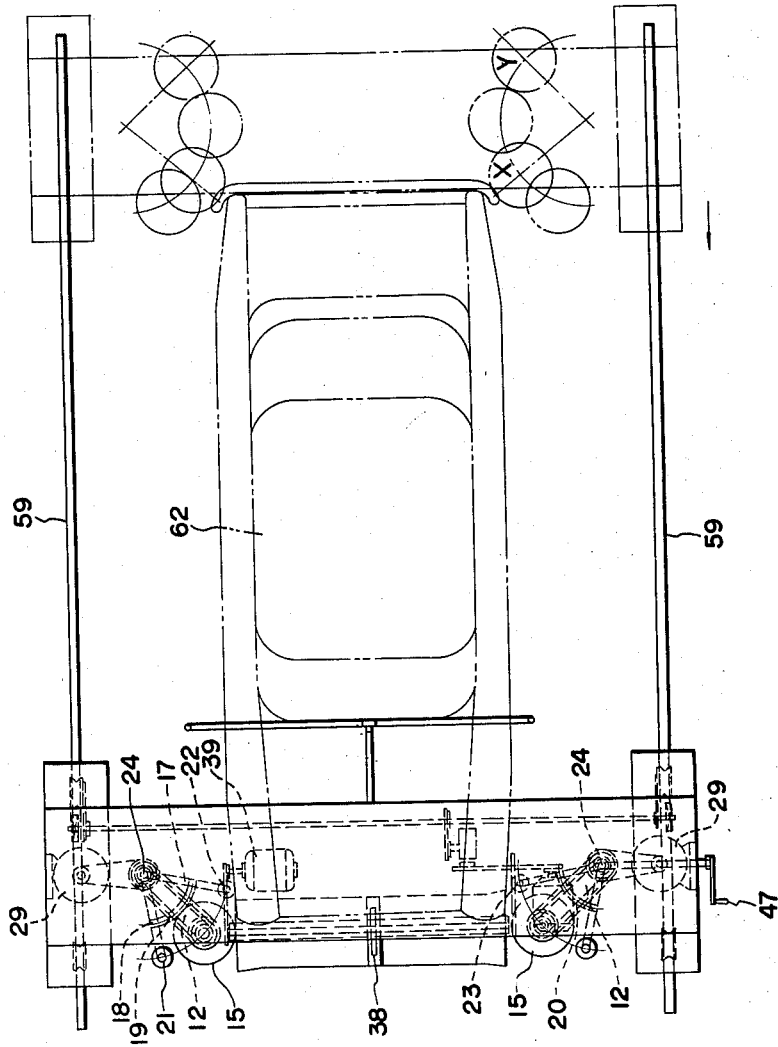
Figure 3:
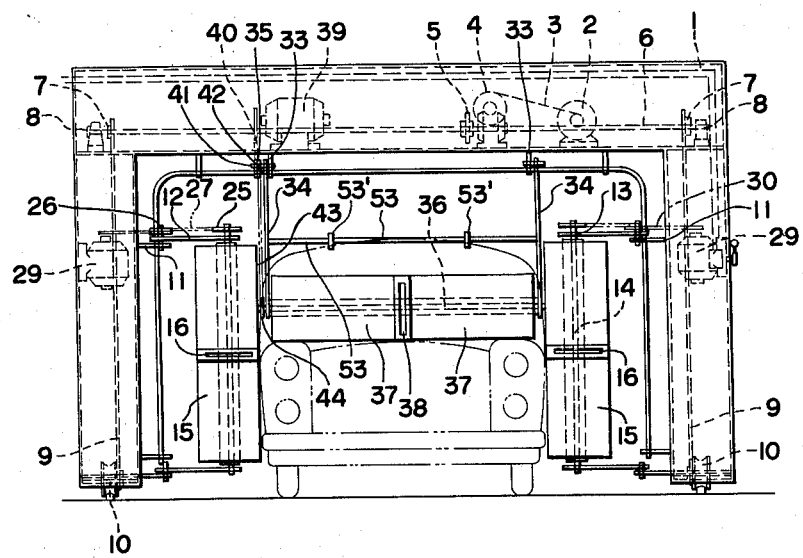
Figure 6:
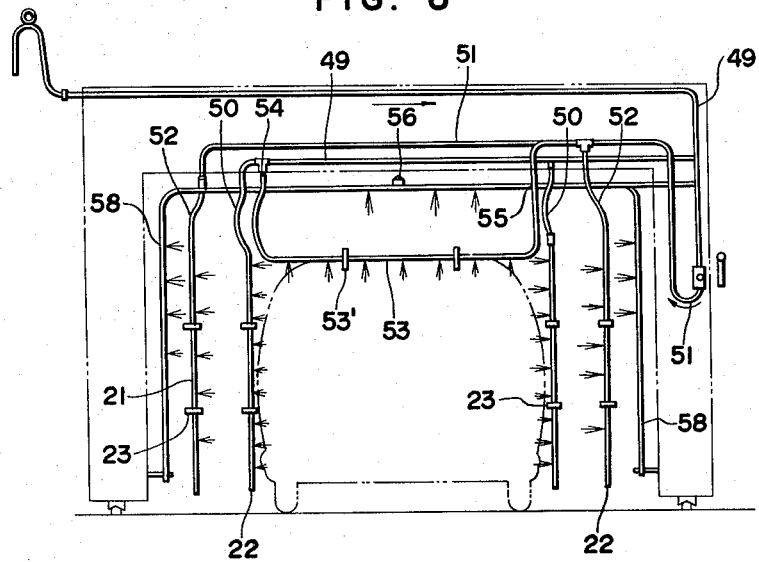

There are other objects and particularities of the invention which will become obvious from the following description with reference to the accompanying drawings, in which:

FIG. 1 is a side view of a washing device showing a preferred embodiment of the invention;
FIG. 2 is a plan view thereof;
FIG. 3 is a front elevational view as viewed from the left side of the device shown in FIG. 1;
FIG. 4 is a side view showing a washing water piping arrangement adapted to the device of the invention;
FIG. 5 is a plan view of FIG. 4;
FIG. 6 is a front elevational view as viewed from the left side of the arrangement shown in FIG. 4;
FIG. 7 is an enlarged plan view showing the mounting of a rotary brush;
FIG. 8 is an enlarged longitudinal sectional side view of the mounting arrangement of FIG. 7, the section being taken through the axis of said brush;
FIG. 9 is a perspective view of the piping arrangement shown in FIGS. 4 through 6; and
FIGS. 10A and 10B are explanatory views of a four-way cock which is shown in two operating positions.

Now referring to the drawings, there is shown in FIGS. 1 through 3 a travelling frame 1 of substantially U-shaped structure having parallel side members and top longitudinal members suitably dimensioned to accommodate therein an automotive vehicle. The travelling frame 1 is adapted to be run to and fro on rails 59 by wheels 10 which are driven by a suitable conventional reversible drive means. The drive means comprises an electric motor 2 mounted on the upper part of the travelling frame 1 and a reduction gear 4, between which a drive belt 3 is disposed. The driving power from the motor 2 is transmitted through the reduction gear 4 to a sprocket wheel 5 firmly secured on a counter shaft 6, thence to the wheels 10 of the travelling frame 1 through sprocket wheels 7 and suitable driving chains 9. The counter shaft 6 is journalled in bearings 8 in the usual manner.

As mentioned above, the travelling frame 1 is adapted to be reversed at each extremity of its travel on the rails. The reversing movement is actuated by limit switches 60 and 60' disposed at the right- and left-hand ends of the rails, respectively. The limit switches 60 and 60' are electrically connected through an electromagnetic push button switch 61 to the main drive motor 2 and brush drive motors 29 and 39.

The travelling frame 1 is made symmetrical with respect to the transverse center line thereof, therefore, the following description will refer to only the left-hand side half thereof. It is understood the other side is similar thereto. Two brackets 11, 11 extend horizontally inwardly, FIG. 3, from the side members of the frame 1. A swinging arm 12 is pivotally mounted FIGS. 2, 3 and 7, at one end on each bracket 11 by means of a pivot pin 24 and is provided at the other end with a bearing portion 13 for rotatably supporting one end of a shaft 14 of a brush 15. A bifurcated member 17 is also pivotally supported by the pivot pin 24 at each bracket 11 and supports a spray pipe 21 for soapsuds and a spray pipe 22 for fresh water at the ends of its bifurcated arms as best shown in FIG. 7. The rotary brush 15, of substantially cylindrical shape, is radially cut into two sections between which a protective roller 16 is rotatably mounted on the common shaft 14.

The protective roller 16 has soft rubber or like material baked onto the periphery thereof and is effective to protect the vehicle body from being scored or otherwise harmed by excessive brushing. The bifurcated arms of each of the members 17 are rigidly connected together by a connecting plate 19 of generally arcuate shape by means of pins 18. Each connecting plate 19 is firmly secured at the central portion thereof to a respective swinging arm 12 by means of a fixing pin 20 so that one swinging arm 12 can pivot about the pivot pin 24 together with a bifurcated member 17 independently of the pivotal movement of the other swinging arm 12. A coil spring 32 is connected to a lug 31 of each arm 12 and tends to urge the arm 12, hence the brush 15 outwardly.

The spray pipes 21 and 22 are provided with a plurality of guide rollers 23 which are rotatably disposed about the pipes in spaced apart relationship. A sprocket wheel 26 is loosely mounted on the upper part of one of the pivot pins 24 so as to be rotatably thereabout and has a sprocket wheel 28 integrally made therewith. A sprocket wheel 25 is firmly secured on the upper part of the shaft 14 and a drive chain 27 is passed between the sprocket wheels 25 and 26. A drive chain 30 extends between the sprocket wheel 28 and the electric motor 29 mounted on the travelling frame 1 so that the brush can be adequately driven by the electric motor 29.

Although the left-hand side arrangement of the rotary brush 15 and associated mechanisms has been described in the foregoing, it will be understood that the right-hand side arrangement is symmetrical therewith and operates in a corresponding manner.

Two brackets 33, 33 are fixed to the upper part of the travelling frame 1, and a vertical swinging arm 34 is pivotally connected at one end to each bracket 33 by means of a pivot pin 35. Between the other or lower ends of the swinging arms 34, a shaft 36 is rotatably mounted and has a brush 37 firmly secured thereto. The brush 37 is also split into two sections between which a protective roller 38 is rotatably disposed.

The protective roller 38 has soft rubber or like material baked onto the periphery thereof.

A balance weight may be provided on a suitable portion of the supporting means for the rotary brush 37 in order to insure its gravitational abutment with the upper face of the vehicle body to suit the contour thereof.

An upper spray pipe 53 is supported by the swinging arms 34 in parallelly juxtaposed relationship with the rotary brush 37, and has a plurality of guide rollers 53′ disposed in spaced apart relationship. The brush 37 is adapted to be driven from the electric motor 39 mounted on the upper part of the travelling frame 1 through a driving arrangement. The driving arrangement comprises a sprocket wheel 42 loosely and rotatably mounted on one of the pivot pins 35 and has a sprocket wheel 41 integrally made therewith. A drive chain 40 extends from the motor 39 to the sprocket wheel 41 for free rotation of the latter. Further, a drive chain 43 is disposed between the sprocket wheel 42 and a sprocket wheel 44 firmly secured to one end of the shaft 36 for free rotation of the brush 37 mounted thereon.

A fresh water supply pipe 45 and a soapsuds supply pipe 48 are connected at one end to water supply hoses 45′ and 48′ from respective sources, respectively. The other ends of the pipes 45 and 48 are connected to a four-way cock 46 which is mounted on a part of the frame 1 and operated by a handle 47. From the four-way cock 46, a fresh water pipe 49 extends upwardly, then runs longitudinally along the upper part of the frame 1 and finally connected to the spray pipes 22, 22 by means of connection hoses 50, 50. While a soapsuds supply pipe 51 likewise extends upwardly from the cock 46, then runs longitudinally along the upper part of the frame 1 and ultimately connected to the spray pipes 21, 21 by means of connection hoses 52, 52.

The spray pipe 53, which is supported by the swinging arms 34 for the rotary brush 37 as described previously, is connected to the fresh water supply pipe 49 at one end and to the soapsuds supply pipe 51 at the other end, through connection hoses 54 and 55, respectively. Therefore it will be understood that the spray pipe 53 is adapted to supply a spray of either fresh water or soapsuds by the selective change-over of the four-way cock 46. A fresh water supply pipe 56 is further branched from the fresh water supply pipe 45 and is connected to a substantially U-shaped spray pipe 58 through a cock 57, said pipe 58 being disposed on the side remote from the pipes 21 and 22, as best seen in FIG. 9.

The washing device of the invention operates in the following manner. At first, the automotive vehicle 62 to be washed is positioned and held stationary at a predetermined position intermediate between the rails 59, with the front or rear end of the vehicle body placed just below the travelling frame 1 which is at a starting position at the left-hand side end of the rails as shown in FIG. 1. Then, the handle 47 of the four-way cock 46 is manipulated to permit the communication between the fresh water supply pipes 45 and 49 as shown in FIG. 10A. Thus, fresh water flows from the fresh water supply pipe 49 through the connection hoses 50, 50 to the fresh water spray pipes 22, 22′ disposed on the sides of the rotary brushes 15, 15, thence fresh water is ejected in the form of a spray onto the side surfaces of the vehicle body, and, at the same time, fresh water supplied to the spray pipe 53 through the connection hose 54 is ejected onto the upper surface of the body.

When, at the same time, the push button switch 61 is manipulated, the motors 29, 39 and 2 start to run. The motors 29 rotate the brush shafts 14, 14 through the drive chains 30 and 27 to rotate the brushes 15, 15. The rotation of the motor 39 rotates the rotary brush 37 through the drive chains 40 and 43. While, the rotation of the motor 2 is transmitted through the reduction gear 4 to the counter shaft 6, which in turn rotates the travelling wheels 10, 10 through the sprocket wheels 7 and the drive chains 9. Thus, the travelling frame 1 is caused to travel on the rails 59 towards the right as shown in FIG. 1, while spraying and brushing the vehicle body. Therefore, the vehicle body 62 can be successively washed on the upper and side surfaces thereof.

On completion of washing during rightward travel, the travelling frame 1 reaches the right-hand side extremity of the rails 59 as shown by chain-dot lines in FIG. 2 and contacts the limit switch 60, a magnet relay is energized to reverse the direction of rotation of the travelling motor 2, hence the direction of travel of the travelling frame 1, which therefore starts to run towards the left. The motors 29 and 39 are reversed in their direction of rotation simultaneously, and the directions of rotation of the brushes 15 and 37 are also reversed. In this case, the brushes 15 and 37 are urged by the vehicle body to swing the swinging arms 12 and 34 from a position X to a new position Y. This swinging motion permits the soapsuds spray pipes 21, 21 and the spray pipe 53 to be disposed ahead of the brushes 15, 15 and 37 with respect to the direction of the travel of the frame 1.

As soon as the travelling frame 1 starts its leftward travel, the four-way cock 46 is manipulated to a position shown in FIG. 10B. This manipulation will provide the communication between the soapsuds supply pipes 48 and 51, and soapy water is sprayed onto the vehicle body from the spray pipes 21, 21 and 53 through the connection hoses 52 and 55. Then, the rotary brushes 15, 15 and 37 effect the finish brushing. Thus, dirt, mud and like matter attached on the vehicle body can completely be washed away and brushed off. Further, at the beginning of the return travel of the travelling frame 1, the cock 57 is opened to supply a spray of fresh water from the spray pipe 58 and to wash away the soapsuds for finish cleaning. When the travelling frame 1 reaches the left-hand side extremity of the rails 59 after having finished the washing operation, it actuates the limit switch 60' which deenergizes all of the motors, stopping rotation of the brushes and travel of the frame 1. Then, the four-way cock 46 and the cock 57 may be shut off to stop the supply of fresh water and soapy water. Thus one washing cycle is completed.

From the foregoing description, it will be readily seen that automotive vehicles of varying shapes can be completely washed without any need of adjustment applied thereto, since the rotary brushes can follow the uneven contour of the vehicle body and make a differential movement in suitably abutted relationship therewith due to the constitution of the supporting mechanisms therefor which comprise pivotal mounting of the swinging arms supporting the brushes as well as the tension devices by means of the coil springs for the side brushes, and the gravitational abutment in the case of the upper brush. It will also be understood that the washing device of the invention has a prominent effect that the extremely reasonable and consistent washing operation can be automatically made during one cycle of the travelling frame, which operation includes the preparatory washing by fresh water for removal of dirt, mud and like material and cleaning by soapy water with subsequent finish cleaning by fresh water. The washing device is especially useful in that it entails only a slight installation cost and permits installation at a comparatively narrow oil station, with an added advantage of minimum requirement for labor and washing water.

What is claimed is:

1. A vehicle washing apparatus comprising, a travelling frame for travelling in opposite directions relative to a stationary vehicle to be washed, a plurality of rotatably driven scrubbing brushes mounted on said frame and disposed for scrubbing the side surfaces and another brush for scrubbing the upper surfaces of the vehicle during travelling of said frame, drive means for automatically driving the brushes in a given respective direction of rotation during travel of said frame in one direction and in an opposite respective direction of rotation during travel of said frame in another direction opposite to said one direction, said drive means including means for driving said travelling frame in opposite directions relative to said stationary vehicle, means independently mounting each of said brushes internally of said frame for scrubbing the side surfaces of the vehicle, for each of said brushes, means comprising a pair of angularly spaced, pivoted arms, means mounted on said arms for supplying a cleaning agent and rinsing water alternatively in dependence upon the direction of travel of said frame, and the last mentioned means comprising means for delivering the cleaning agent on said vehicle surfaces ahead of the scrubbing brushes and the rinsing water rearwardly thereof during travel of said frame.

2. A vehicle washing apparatus according to claim 1, said means mounting said brushes comprising means mounting said brushes for scrubbing said side surfaces between the angularly spaced arms, means comprising rollers on each arm for controlling the position of a respective brush, means maintaining said brushes in contact scrubbing respective ones of said side surfaces during travel of said frame, and said arms being pivoted through an obtuse angle of movement.

3. A vehicle washing apparatus comprising, a travelling frame for travelling on opposite directions relative to a stationary vehicle to be washed, a plurality of rotatably driven driven scrubbing brushes mounted on said frame and disposed for scrubbing the side surfaces and another brush for scrubbing the upper surfaces of the vehicle during travelling of said frame, drive means for automatically driving the brushes in a given respective direction of rotation during travel of said frame in one direction and in an opposite respective direction of rotation during travel of said frame in another direction opposite to said one direction, said drive means including means for driving said travelling frame in opposite directions relative to said stationary vehicle, and means cooperative with a respective brush to supply alternately rinsing water and a cleaning agent depending on the direction of travel of said respective brush.

4. A vehicle washing apparatus according to claim 3, including brush positioning means.

References Cited by the Examiner

UNITED STATES PATENTS

| 2,579,866 | 12/51 | Rousseau | 15—21 |
| 2,589,255 | 3/52 | Holmes | 15—53 |
| 2,627,080 | 2/53 | Holmes | 15—53 |
| 2,754,834 | 7/56 | Merancy et al. | 134—123 XR |
| 2,756,759 | 7/56 | Swain | 134—123 XR |
| 2,865,034 | 12/58 | Petite | 15—53 |
| 3,107,676 | 10/63 | Thorson | 134—123 |

FOREIGN PATENTS

| 349,180 | 11/60 | Switzerland. |
| 721,450 | 1/55 | Great Britain. |
| 1,236,015 | 6/60 | France. |

CHARLES A. WILLMUTH, *Primary Examiner.*